(12) United States Patent
Yang

(10) Patent No.: US 12,146,043 B2
(45) Date of Patent: Nov. 19, 2024

(54) LOW DENSITY CELLULAR PVC BOARDS WITH SEALED EDGES

(71) Applicant: Inteplast Group Corporation, Livingston, NJ (US)

(72) Inventor: Haur-Horng Yang, Victoria, TX (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 913 days.

(21) Appl. No.: 16/455,107

(22) Filed: Jun. 27, 2019

(65) Prior Publication Data

US 2019/0315938 A1    Oct. 17, 2019

Related U.S. Application Data

(62) Division of application No. 15/664,911, filed on Jul. 31, 2017, now Pat. No. 10,392,489.

(51) Int. Cl.
| | |
|---|---|
| *C08J 9/36* | (2006.01) |
| *B29C 41/20* | (2006.01) |
| *C09D 127/06* | (2006.01) |
| *C09J 127/06* | (2006.01) |
| *E04B 9/04* | (2006.01) |
| *E04D 13/158* | (2006.01) |

(Continued)

(52) U.S. Cl.
CPC .............. *C08J 9/365* (2013.01); *B29C 41/20* (2013.01); *C09D 127/06* (2013.01); *C09J 127/06* (2013.01); *C08J 2327/06* (2013.01); *C08J 2427/06* (2013.01); *E04B 9/04* (2013.01); *E04D 13/158* (2013.01); *E04F 19/02* (2013.01); *E04F 2019/0422* (2013.01)

(58) Field of Classification Search
CPC .......... E04F 19/04; E04F 19/046–0495; E04F 2019/0422–0454; C08J 9/224; C08J 9/34; C08J 9/36–365; C08J 2327/06; B29C 44/56; B29C 44/5627–5681
See application file for complete search history.

(56) References Cited

U.S. PATENT DOCUMENTS

| | | | | |
|---|---|---|---|---|
| 2,772,194 A | * | 11/1956 | Fisher | ...................... C08J 9/365 |
| | | | | 264/DIG. 60 |
| 3,293,108 A | | 10/1965 | Nairn et al. | |
| 3,397,518 A | | 8/1968 | Rogers | |

(Continued)

FOREIGN PATENT DOCUMENTS

| | | | | |
|---|---|---|---|---|
| CH | | 669229 A | * 2/1989 | .............. B41M 1/30 |
| CN | | 201704861 U | * 1/2011 | |

(Continued)

OTHER PUBLICATIONS

Shutov et al. Integral/Structural Polymer Foams: Technology, Properties and Applications. Springer-Verlag Berlin Heidelberg. 1986. pp. 111-122. (Year: 1986).*

(Continued)

*Primary Examiner* — Stephen E Rieth
(74) *Attorney, Agent, or Firm* — Stinson LLP

(57) ABSTRACT

A construction component comprising a foamed cellular board comprising smooth exterior surfaces separated by a cellular network and cut edges, and sealed caps adhered to the cut edges on the foamed cellular boar. The board has a density of less than 0.55 g/cm³, and the cut edges on which the sealed caps are adhered are unmelted edges.

19 Claims, 3 Drawing Sheets

(51) Int. Cl.
    *E04F 19/02* (2006.01)
    *E04F 19/04* (2006.01)

(56) References Cited

U.S. PATENT DOCUMENTS

| | | | | |
|---|---|---|---|---|
| 3,764,642 | A | * | 10/1973 | Boutillier .............. B29C 48/12 |
| | | | | 264/237 |
| 4,128,251 | A | | 12/1978 | Gaither et al. |
| 4,346,814 | A | | 8/1982 | Rentmeester |
| 4,407,882 | A | | 10/1983 | Hauser et al. |
| 5,399,393 | A | * | 3/1995 | Zoller .................... B29C 39/10 |
| | | | | 52/716.5 |
| 5,679,721 | A | | 10/1997 | Courtoy et al. |
| 6,682,680 | B2 | | 1/2004 | Peterman |
| 8,333,582 | B2 | | 12/2012 | Kidwell et al. |
| 8,377,357 | B2 | | 2/2013 | Hartmann et al. |
| 9,302,425 | B1 | | 4/2016 | Dotson et al. |
| 2007/0228254 | A1 | * | 10/2007 | England ................ B28B 7/0085 |
| | | | | 249/189 |
| 2010/0213633 | A1 | * | 8/2010 | Kidwell ................ B29C 67/00 |
| | | | | 264/175 |
| 2016/0215119 | A1 | | 7/2016 | Wagner et al. |

FOREIGN PATENT DOCUMENTS

| | | |
|---|---|---|
| CN | 204083760 | 1/2015 |
| DE | 10061361 | 6/2002 |
| GB | 1013111 A * | 12/1965 |

OTHER PUBLICATIONS

Foam Boards. BCI Imaging. May 15, 2014. (Year: 2014).*
How to Cut Molding. HowStuffWorks. https://home.howstuffworks.com/home-improvement/remodeling/cut-molding1.htm. As viewed on Jul. 7, 2017. (Year: 2017).*
Chanda, M. Plastics Technology Handbook: Fifth Edition. CRC Press. Taylor & Francis Group, LLC. 2018. pp. 65-70. (Year: 2018).*
Summers, J. W. The melting temperature (or not melting) of poly(vinyl chloride). Journal of Vinyl & Additive Technology, 2008, 14, 3, 105-109. (Year: 2008).*
Poly-Comp Plastic Rustification. Sylvan Industries, LLC. http://www.sylvanproducts.com/products/polyreveal.html. As viewed on Jul. 22, 2017. (Year: 2017).*
Cheremisinoff, N. P. Condensed Encyclopedia of Polymer Engineering Terms. Butterworth-Heinemann. 2001. pp. 45-47. (Year: 2001).*
Machine Translation of CN201704861U. Jan. 12, 2011. (Year: 2011).*
Machine translation of CH669229A. Feb. 28, 1989. (Year: 1989).*
The FOREX range of expanded rigid sheet materials. FOREX. Jan. 2011. (Year: 2011).*
Working directions for FOREX classic (also applicable to FOREX print). FOREX. 2007. (Year: 2007).*
PVC-Butyl Acrylate Plastisol, Safety Data Sheet, Version 1, dated Oct. 25, 2016, 7 pages.
Eastman VersaMax(TM) Plus Plasticizer, Safety Data Sheet, Version 2.0, Revised Sep. 2, 2015, 8 pages.

* cited by examiner

LOW DENSITY CELLULAR PVC BOARDS WITH SEALED EDGES

REFERENCE TO RELATED APPLICATION

This application is a divisional application based on U.S. application Ser. No. 15/664,911 filed Jul. 31, 2017, the entire disclosure of which is expressly incorporated herein by reference.

FIELD OF THE INVENTION

The present invention generally relates to cellular boards made from polyvinylchloride (PVC)-based materials, which boards are often used in construction and especially non-load bearing applications such as decorative trim, outdoor ceilings, fascia, and the like, as well as for signage and other applications.

BACKGROUND OF THE INVENTION

Decorative trim, outdoor ceiling panels, fascia, and other non-load bearing construction components as well as signage and other board components are often cut from cellular foam boards made from PVC-based materials. The foam boards comprise two flat outer panels separated from each other by a cellular network. This construction is lightweight and makes efficient use of raw materials, while still providing sufficient strength for non-load bearing applications.

The action of cutting the board into components exposes open and sometimes rough edges providing exterior access to the cellular network between the two panels. This access allows dirt and debris to accumulate in the open cut edges, which is exacerbated by the fact that the panels are used at dusty construction sites. This accumulation of dirt is unsightly, which is especially undesirable since customers expect new construction to be clean. Porous edges can collect organic debris, which may be susceptible to the growth of mold and fungus. It is therefore preferable to impart a smooth seal to cut edges of foam board components to inhibit access and accumulation of dirt along the edges.

U.S. Pat. Nos. 8,333,582 and 9,302,425 describe machines and methods that employ heat to heat seal fresh cut edges of foam board. Heat sealing, however, is not a viable option for lower density foam board components because there is not enough material to melt and seal the edges cleanly or consistently.

There is therefore a need for an alternative approach to sealing cut edges of cellular foam board.

SUMMARY OF THE INVENTION

Among the several objects of the invention, therefore, are a method for sealing cut edges of foam board; a method for sealing cut edges that can be applied even to lower density foam board such as foam board with a density of less than about 0.5 g/cc; and foam board products with sealed edges; and such sealing methods as applied to components other than flat board, such as trim components having curved or otherwise non-flat profile features.

Briefly, therefore, the invention is directed to a method for making ornamental trim for use in construction comprising applying a sealing composition to a cut edge of a foam board component comprising a cellular network exposed by said cut edge, wherein the sealing composition comprises PVC particles suspended in flowable medium; heating the sealing composition to a temperature at which the flowable medium solvates the PVC particles; and cooling the sealing composition to form a continuous sealing cap on the cut edge.

Other objects and features will be in part apparent and in part pointed out hereinafter.

DETAILED DESCRIPTION OF THE INVENTION

In accordance with the present invention, boards are cut and their edges are sealed with a specially formulated sealing composition and further processed with exposure to only modestly elevated temperatures to create seals which inhibit or prevent infiltration of water and dirt into the edges. The boards may be construction boards, profiled trim, or other such length of material made cut from a material subject to infiltration of water and dirt into cut edges. Such components include PVC components, as well as components made from other materials, such as wood, polystyrene, polyurethane, polyethylene lumber, other polymer composite materials, and fiber cement. In one preferred embodiment, construction components are cut from PVC-based panels, and their edges are sealed with a specially formulated sealing composition and further processed with exposure to only modestly elevated temperatures to create seals which inhibit or prevent infiltration of water and dirt into the edges. The construction components include but are not limited to decorative trim, outdoor ceiling panels, fascia, decking, railing, fencing, and other non-load bearing and low-load bearing construction components.

One advantage to the present process which is attributable to the fact that forming the seal involves exposure only to modestly elevated temperatures and avoids exposure to substantially elevated temperatures is that it allows the use of lower density foam. Lower density foam typically has larger cell size (bubble size), which does not lend itself to heat sealing. The larger bubbles generally present a non-uniform bubble pattern at cut edges. The application of heat and associated melting therefore imparts a non-uniform edge appearance, as the edge is pinched thinner where the cell openings have a wide intersection at the edge, and is thicker where the cell openings have a narrower intersection at the edge. So if one is to seal edges of trim or other board components using traditional heat sealing methods, one must use higher density foam or suffer from a less desirable edge appearance. Since the inventive method does not involve high heat and does not involving melting of the board itself, the edge remains uniform and attractive.

Figure 1:
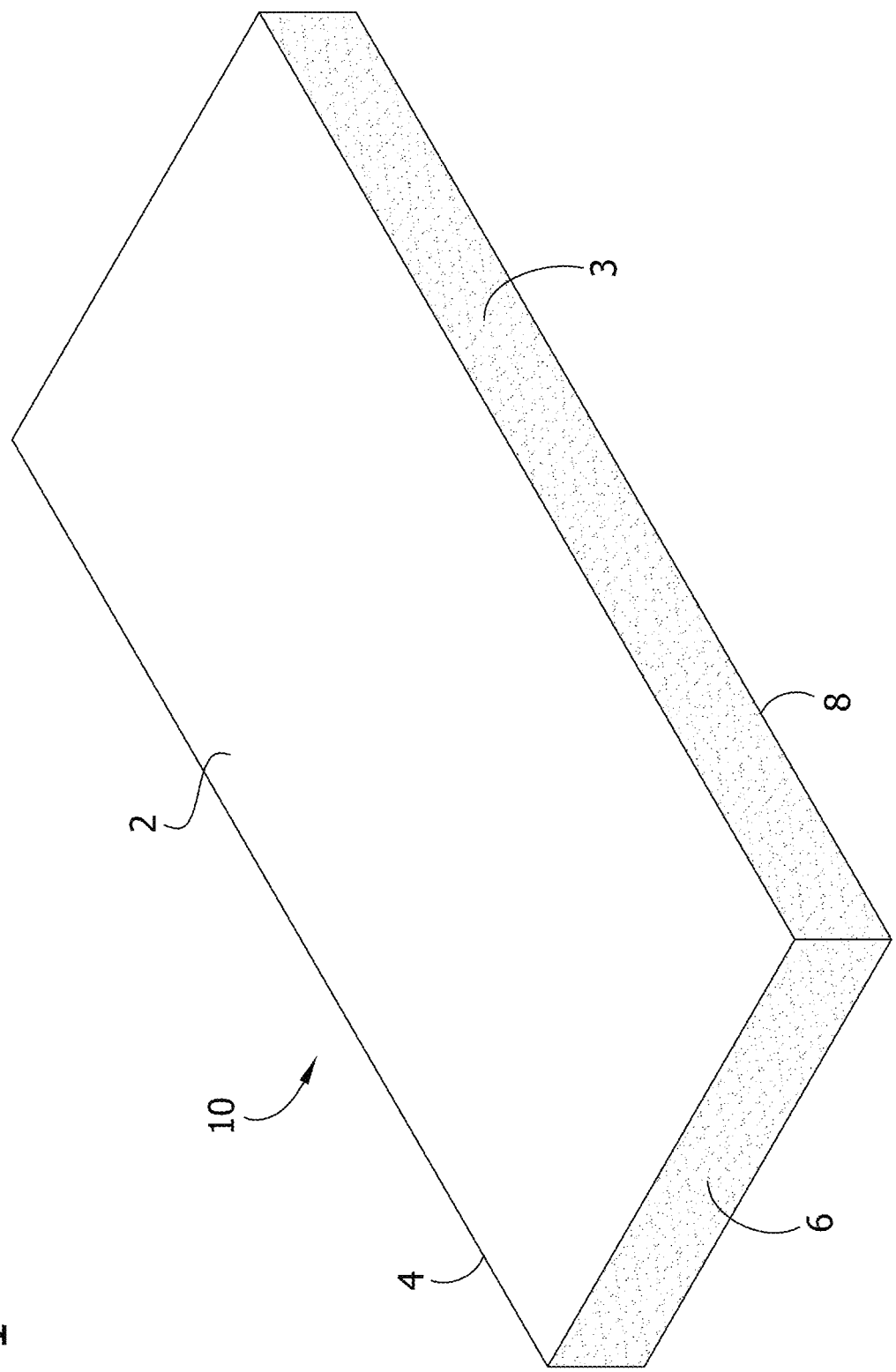
FIG. 1 is a schematic illustration of a foam board of the type processed according to this invention.

FIG. 1 shows a foam board of the type sealed in accordance with the invention. The foam board 10 has a top surface 2, two cut longitudinal side edges 4 and 3, two cut end edges 6, and a bottom surface 8 having the same smooth texture as the top surface. The top and bottom surfaces have a smooth and relatively hard skin which is formed during extrusion and cooling of the foam sheet. The ends and side edges have a rough surface resulting from opening of cells having been cut when the board is cut to size.

The method of the invention is therefore preferably performed using components which have a density of less than 0.55 g/cc, such as between about 0.3 and 0.55 g/cc, preferably between about 0.3 and 0.5 g/cc, between about 0.3 and 0.45 g/cc, or between about 0.3 and 0.4 g/cc. While the method in that preferred embodiment is performed using lower density board, in other embodiments it can be employed using higher density foam board components which have a density of greater than 0.5 g/cc, such as 0.55 or greater, such as 0.55 to 1 g/cc. There are significant advantages to using foam board components which have this lower density. One advantage is conservation of materials. For example, a foam board component with a density of 0.4 g/cc requires less than 80% of the PVC-based raw material as does a component with a density of 0.6 g/cc. This translates to cost savings as well as weight savings. A board of lower density has thinner cells walls, larger cells, and more hollow cells and therefore uses less material in comparison to a higher density board.

In one embodiment of the invention using the lower density foam board, it is preferred to manufacture the board by the so-called Celuka extrusion process. The Celuka process involves extruding followed by rapid cooling of the outer surface of board, while expanding the inside of the product, forming a solid, hard skin, which is the toughest surface in the industry. The hard surface on Celuka-formed board products protects the products from dents and scratches, not only once it's in place on the project, but also during transit to the job site, which means fewer damages and less product returns. The Celuka process is in contrast with the so-called free foam process. In the free foam process, cooling is performed by the extrusion traveling through a series of cooling rollers. The gap between these rollers helps set the thickness of the board. Since the thickness is not immediately set by the first set of rollers, the material can freely foam, thus the name "free foam" process. In contrast, with the Celuka process, the sheets go through calibrators that set the thickness. With the thickness set, the foaming occurs in the inward direction. In embodiments of the invention employing higher density board material, the invention may be used with board material made by either a Celuka process or a free foam process.

In performing the process of the invention, a sealing composition is applied to a cut edge of a construction component of foam board. The sealing composition comprises PVC particles suspended in flowable medium which has a consistency for dispensing onto and adhering to the edge, such as by painting or spraying. Once the sealing composition is in position on the cut edge, heat is applied to the sealing composition so that it reaches a temperature at which the flowable medium solvates the PVC particles. The flowable medium is formulated so that at room temperature it is flowable and a poor solvent for PVC, and at a modestly elevated temperature the flowable medium is a good solvent for PVC. Upon heating the sealing composition on the cut edge, the flowable medium therefore solvates the PVC particles in the sealing composition, and also solvates PVC molecules of the board material at the cut edge, thus forming a continuous gel coating over the cut edge. With PVC from both the sealing composition and the board cut edge surface now solvated in the flowable medium, the long chain PVC molecules from the board and the sealing composition entangle. The temperature is then lowered to room temperature and a solid coating is formed.

The sealing composition contains PVC resin particles in a flowable medium which is a plasticizer. The preferred plasticizer contains one or more of several phthalate plasticizer compounds, such as DEHP, DPHP, DINP, DOP, etc.; and/or non-phthalate plasticizer compounds such as trimelitates-based plasticizers, adipate-based plasticizers, bio-based plasticizers, terephthalic ester, DOTP, DOHP, DINP, isodecyl benzoate, others, or combinations. The flowable medium is selected with consideration of various properties including fast fusion, high compatibility with PVC, lower processing temperature, lower melt viscosity, low haze, lower dry time, minimized migration into adhesive backing, avoidance of matte surface appearance, low rate of extraction by water, good performance at low temperature, and softness at low temperature. The PVC particles comprise one or more of dispersion copolymer PVC resins, dispersion homopolymer PVC resins, blended homopolymer PVC resins, blended copolymer PVC resins, and suspension copolymer PVC resin. The PVC is selected to have low paste viscosities, excellent heat stability, and rapid fusion characteristics. Preferably, at least 90 wt % of the PVC particles have a particle size between about 0.1 and about 100 microns, such as between about 0.5 and about 10 microns. The particles are selected to be large enough to flow well and avoid high viscosity, and small enough for fast gelation and penetration into the PVC cell cavities on the edges of the trim to help form high integrity bonding between the sealing composition and the substrate.

As a general proposition, the proportions of these two major components are from about 35 to about 85 parts of the plasticizer per hundred parts of PVC resin, by weight. This is designated herein as "phr" meaning parts per hundred resin parts. All phr units herein are parts by weight per hundred parts resin, by weight. So a composition that has 10 grams of plasticizer and 100 grams of PVC resin would comprise 10 phr plasticizer. In this invention, the sealing composition proportions are between about 35 and about 85 parts of the plasticizer per hundred parts PVC resin, by weight, or about 35 to 85 phr of plasticizer. Particular embodiments contain between about 40 phr and about 80 phr of the plasticizer, such as between about 45 phr and about 75 phr, or between about 50 phr and about 70 phr.

Among additional optional components of the sealing composition are pigments, heat stabilizers, fillers, and other additives. Optional other additives in minor proportions typically of no more than 2 or so phr include viscosity depressants, high gloss additives, reducers, detackifiers, low cure additives, UV stabilizers, flame retardants, and smoke suppressants. These various optional components are dissolved in the plasticizer.

The pigment is one or more of any organic or inorganic pigment used in these types of board materials, and is selected to impart color and to protect from UV damage. The proportion of pigment, when employed, is generally greater than 0 phr and up to about 25 phr, specifically greater than about 0 phr and up to about 20 phr, such as specifically between about 5 phr and about 15 phr.

The optional heat stabilizer may be an organic acid salt, such as calcium-zinc based carboxylate, or an organotin compound, such as methyltin, butyltin and octyltin mercaptides, as well as carboxylates. Other types of stabilizers such as mixed alkyl, organic and miscellaneous stabilizers, and carboxylic or mercaptoester salt of antimony, strontium, potassium can also be used. The proportion of heat stabilizer in the sealing composition, when used, is greater than 0 phr and up to about 2.5 phr, such as up to about 2.0 phr, or up to about 1.5 phr, or up to about 1.0 phr. The optional heat stabilizer is selected to provide good light stability, heat stability, and weathering resistance, good inherent lubricating properties, good processing, good initial color and long term stability. This component can enhance good clarity in clear vinyl applications. It can also inhibit hydrogen chloride elimination due to heat and subsequent decomposition.

The optional filler material is used to provide bulk at low cost and may be calcium carbonate, wood flour, cellulose, cotton fiber, lignin, mica, clay, limestone, or other suitable inert material. The proportion of the optional filler material, when employed, is generally greater than 0 phr and about to about 35 phr, such as up to about 30 phr, or up to about 25 phr, or up to about 20 phr.

In performing the overall process, the first operation is to extrude the foam board by methods known in the art. The thickness of a typical board used in connection with this invention is between about 6 mm and about 40 mm, such as between about 12 mm and about 25 mm.

The second operation is to cut the foam board into the strips or other shapes that correspond to construction components. In one embodiment, the board is cut into strips having a relatively narrow width, such as between about 1 and about 24 inches. In a typical embodiment, the length of these strips is between about 8 and about 20 feet.

After cutting, the sealing composition is applied to the cut edges of the cut segments. This is preferably applied by vacuum coating, for example using a DVC.TALENT OMEGA Plast 2x brand and model vacuum coating machine available from Cefla North America, Inc. Alternatively, it is applied by roller coating, painting, or spraying. The sealing composition is applied to a thickness of at least about 40 microns, such as between about 50 and about 175 microns. This thickness is measured from the cut edge of the board and does not include sealing composition that seeps into the open cells on the cut edge.

After application of the sealing composition, heat is applied by hot air oven or IR (infrared) oven to raise the temperature of the sealing composition to between about 135° C. and about 200° C., such as to between about 145° C. and about 165° C. The heat is typically applied for between about 1 and about 60 seconds, such as between about 5 and about 30 seconds. Steam may also optionally be applied to the cut edges during the heating process, which can help maintain a more consistent temperature along the entire cut edge. When the temperature of the plasticizer is raised the plasticizer, which at the elevated temperature becomes a good solvent, swells and solvates the PVC particles in the sealing composition such that they are no longer distinctive particle. The plasticizer also solvates PVC molecules in the top layers of the exposed trim edge to form a homogenous gel. The PVC polymer molecules have long chains such that the long chain PVC molecules of the trim edge become entangled with long chain PVC molecules in the sealing composition. Then when the temperature is lowered, a solid coating is formed. The plastisol is not able to revert back to the form of distinct PVC particles dispersed in plasticizer since the PVC molecules are now entangled. There is no chemical reaction occurred in the process. For cooling, the sealing composition is cooled to room temperature by atmospheric air cooling.

Sealing, heating, and cooling may be repeated a second time or multiple times if necessary or if desired.

EXAMPLE

Six boards were prepared of varying densities and subjected to varying edge treatments as follows:

| Sample No. | Board Density (g/cc) | Edge Treatment |
|---|---|---|
| 1 | 0.43 | None |
| 2 | 0.55 | Heat seal |
| 3 | 0.46 | None |
| 4 | 0.44 | Coating of the invention |
| 5 | 0.58 | Heat seal + coating of the invention |
| 6 | 0.47 | Coating of the invention |

Figure 2:
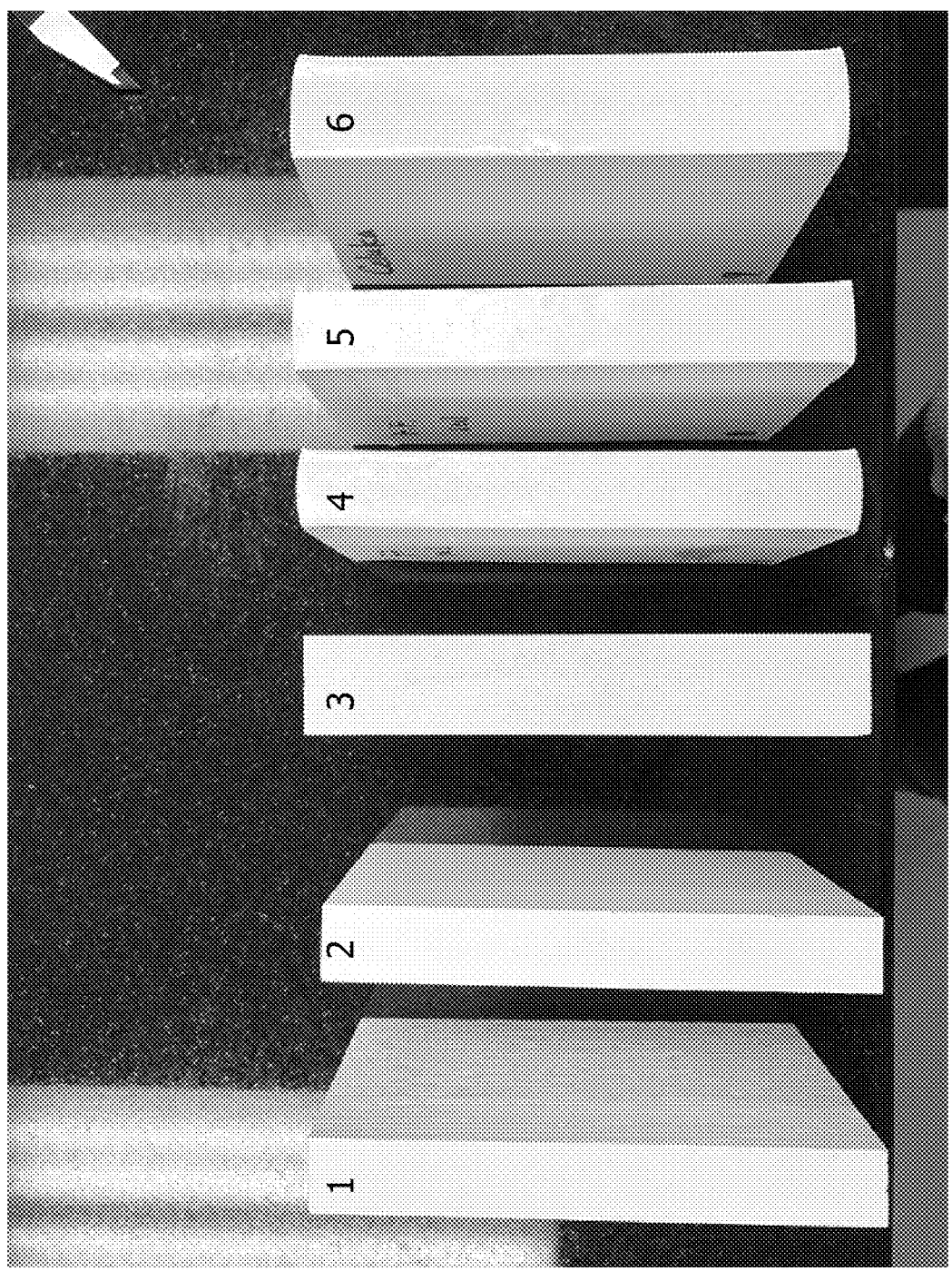
FIG. 2 is a photograph of boards described in the working example before chalk testing.

The composition of the sealing composition was as follows: Plasticizer—DOTP at 60 phr; PVC—dispersion PVC copolymer with particle size less than 5 microns; pigment—10 phr; heat stabilizer—1.5 phr; and filler—0.5 phr. The sealing composition was applied by roller coating, and placed in a traditional oven at a temperature of 130 to 150° C. for 10 minutes. While this production of a prototype involved a 10-minute heating time, this would generally not be suitable for commercial production. For high speed production, vacuum coating followed by more rapid heating in an IR oven are expected to be more practical. The sealing composition was then allowed to air cool to form a continuous sealing cap on the cut edge. The boards are shown in FIG. 2.

Figure 3:
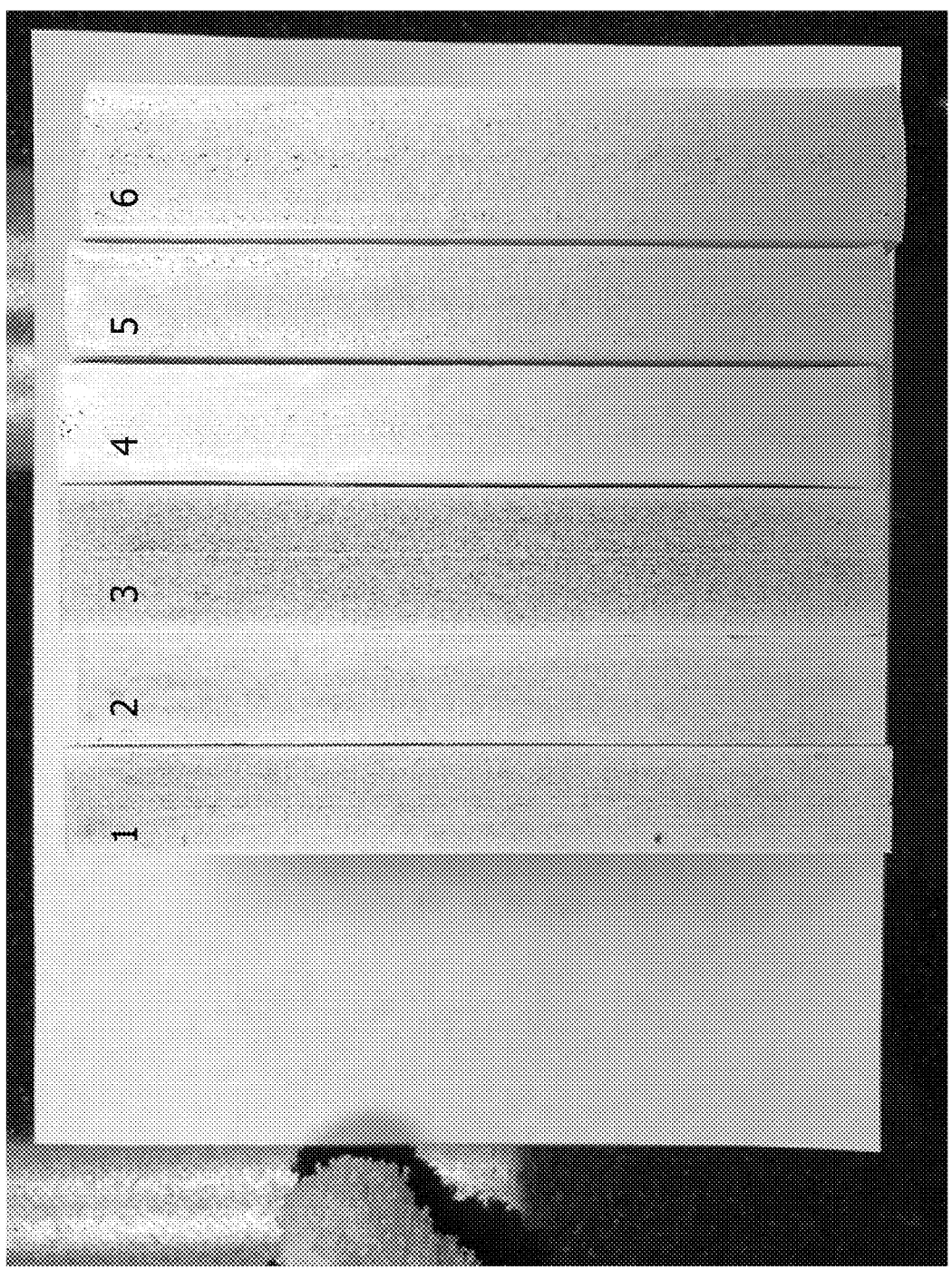
FIG. 3 is a photograph of boards described in the working example after chalk testing.

The boards were then subjected to a chalk test which involves placing the various samples with different densities and different edge treatments adjacent to each other; spreading dry pigment on them; using dry tissue to wipe them so the powder distributes on the samples evenly; and using a wet cloth to wipe the pigment away. Visual inspection shows that the dry pigment which simulates dirt and other contaminants is much easier to remove from the samples receiving the edge treatment of the invention, as evident from FIG. 3. The sample (2) with the heat sealing came cleaner than the unsealed samples (1 and 3), but it was not as good as the samples (4, 5, and 6) with the edge treatment of the invention.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:
1. A construction component comprising:
   a foamed cellular board comprising smooth exterior top and bottom surfaces separated by a cellular network and cut edges; and
   sealed caps adhered to the cut edges on the foamed cellular board derived from PVC molecules solvated in a plasticizer;
   wherein the board has a density of less than 0.55 g/cm$^3$;
   wherein the cut edges on which the sealed caps are adhered are unmelted edges;
   wherein the foamed cellular board and the sealed caps are different compositions;

wherein the smooth exterior top and bottom surfaces are hard skins formed during extrusion and cooling of the foamed cellular board.

2. The construction component of claim 1 consisting essentially of:
   the foamed cellular board comprising smooth exterior top and bottom surfaces separated by a cellular network and cut edges; and
   the sealed caps adhered to the cut edges on the foamed cellular board derived from PVC molecules solvated in a plasticizer.

3. The construction component of claim 1 wherein the board has a density between 0.3 and 0.55 g/cm$^3$.

4. The construction component of claim 1 wherein the board has a density between 0.3 and 0.5 g/cm$^3$.

5. The construction component of claim 1 wherein the board has a density between 0.3 and 0.45 g/cm$^3$.

6. The construction component of claim 1 wherein the board has a density between 0.3 and 0.4 g/cm$^3$.

7. The construction component of claim 1 wherein the board has a thickness between 6 and 40 mm.

8. The construction component of claim 1 wherein the board has a thickness between 12 and 25 mm.

9. The construction component of claim 1 wherein the sealed cap has a thickness of at least 40 microns.

10. The construction component of claim 1 wherein the sealed cap has a thickness between 50 and 175 microns.

11. The construction component of claim 1 wherein the board has a length between 8 and 20 feet, a width between 1 and 24 inches, and a thickness between 6 and 40 mm.

12. The construction component of claim 1 prepared by a method comprising:
   cutting a foam board through its thickness to provide a foam board component having a top surface, a bottom surface, two cut longitudinal side edges, and two cut end edges, where the cut side edges and cut end edges define the outermost perimeter of the foam board component;
   applying a sealing composition to cut edges defining the outermost perimeter of the foam board component comprising a cellular network exposed by said cut edges, wherein the sealing composition comprises PVC particles suspended in the plasticizer while the plasticizer is in a flowable state;
   heating the sealing composition to a temperature at which the plasticizer solvates the PVC particles; and
   cooling the sealing composition to form a continuous sealing cap on the cut edges to which the sealing composition was applied.

13. The construction component of claim 1 wherein the foamed cellular board is prepared by a Celuka process.

14. A construction component consisting essentially of:
   a foamed cellular board comprising smooth exterior top and bottom surfaces separated by a cellular network and cut edges;
   sealed caps on cut edges on the foamed cellular board derived from PVC particles in a flowable plasticizer;
   wherein the board has a density of less than 0.55 g/cm$^3$;
   wherein the cut edges on which the sealed caps are adhered are unmelted edges;
   wherein the foamed cellular board and the sealed caps are different compositions;
   wherein the smooth exterior top and bottom surfaces are hard skins formed during extrusion and cooling of the foamed cellular board.

15. The construction component of claim 14 wherein the board has a density between 0.3 and 0.55 g/cm$^3$.

16. The construction component of claim 14 wherein the board has a density between 0.3 and 0.45 g/cm$^3$.

17. The construction component of claim 14 wherein the board has a thickness between 6 and 40 mm.

18. The construction component of claim 14 wherein the sealed cap has a thickness of at least 40 microns.

19. The construction component of claim 14 wherein the sealed cap has a thickness between 50 and 175 microns.

* * * * *